United States Patent
Huo

(10) Patent No.: US 9,337,950 B2
(45) Date of Patent: May 10, 2016

(54) SERVICE SENSITIVE RESILIENT IPOWDM NETWORK AND METHOD OF OPERATION

(71) Applicant: ZTE (USA) INC., Richardson, TX (US)

(72) Inventor: David Huo, Newton, NJ (US)

(73) Assignee: ZTE (USA) Inc., Austin, TX (US)

( * ) Notice: Subject to any disclaimer, the term of this patent is extended or adjusted under 35 U.S.C. 154(b) by 99 days.

(21) Appl. No.: 14/046,349

(22) Filed: Oct. 4, 2013

(65) Prior Publication Data

US 2014/0099109 A1 Apr. 10, 2014

Related U.S. Application Data

(60) Provisional application No. 61/710,312, filed on Oct. 5, 2012.

(51) Int. Cl.
*H04J 4/00* (2006.01)
*H04J 14/02* (2006.01)
*H04L 12/707* (2013.01)
*H04L 12/725* (2013.01)
*H04L 12/723* (2013.01)
*H04L 12/803* (2013.01)
*H04L 12/851* (2013.01)

(52) U.S. Cl.
CPC ......... *H04J 14/0201* (2013.01); *H04J 14/0212* (2013.01); *H04J 14/0267* (2013.01); *H04L 45/24* (2013.01); *H04L 45/302* (2013.01); *H04L 45/50* (2013.01); *H04L 47/125* (2013.01); *H04L 47/24* (2013.01); *H04J 14/0268* (2013.01)

(58) Field of Classification Search
CPC .............. H04J 14/0201; H04J 14/0212; H04J 14/0267; H04J 14/0268; H04J 14/022; H04J 14/0256; H04J 14/0261; H04J 14/0269; H04J 14/0283; H04L 45/00; H04L 45/24; H04L 45/50; H04L 45/302; H04L 47/24; H04L 47/125; H04Q 11/0001; H04Q 11/0005; H04Q 11/0066; H04Q 11/0071; H04Q 2001/0001; H04Q 2001/0005; H04Q 2001/0024; H04Q 2001/0032; H04Q 2001/0062; H04Q 2001/0077
USPC ......... 398/58, 48, 66, 49, 45, 57, 51, 54, 7, 4, 398/3
See application file for complete search history.

(56) References Cited

U.S. PATENT DOCUMENTS

| | | | |
|---|---|---|---|
| 6,680,948 B1 * | 1/2004 | Majd ................. | H04L 12/56 370/401 |
| 7,394,985 B1 * | 7/2008 | Wang et al. .............. | 398/75 |
| 2005/0265365 A1 * | 12/2005 | Wan ................ | H04L 12/2852 370/401 |
| 2009/0074404 A1 * | 3/2009 | Suryaputra et al. ............ | 398/5 |
| 2010/0135661 A1 * | 6/2010 | Youn ................. | H04J 3/1664 398/68 |

* cited by examiner

*Primary Examiner* — M. R. Sedighian
(74) *Attorney, Agent, or Firm* — Drinker Biddle & Reath LLP

(57) ABSTRACT

A network and method of operating the network, the network comprising a transport layer that includes first and second disjoint but topologically substantially identical subnetworks A and B, each having a plurality of optical switch nodes and/or reconfigurable optical add-drop multiplexer (ROADM) nodes, and a routing layer wherein each router is coupled to at least one node in A and at least one node in B. The network is operable to provide a plurality of classes of services providing corresponding Quality of Service, and the routing layer or routing/transport interface can differentiate between traffic having different classes of service and schedule the traffic based on its service class. In the case either of the subnetworks becomes inoperable, all of the traffic is transferred to the other subnetwork, and the QoS of the classes of service is maintained by scheduling traffic to increase the delay experienced by delay-tolerant traffic.

14 Claims, 3 Drawing Sheets

| OSI Model | | | |
|---|---|---|---|
| | Data unit | Layer | Function |
| Host layers | Data | 7. Application | Network process to application |
| | | 6. Presentation | Data representation, encryption and decryption, convert machine dependent data to machine independent data |
| | | 5. Session | Interhost communication, managing sessions between applications |
| | Segments | 4. Transport | End-to-end connections, reliability and flow control |
| Media layers | Packet/Datagram | 3. Network | Path determination and logical addressing |
| | Frame | 2. Data link | Physical addressing |
| | Bit | 1. Physical | Media, signal and binary transmission |

FIG. 1

SERVICE SENSITIVE RESILIENT IPOWDM NETWORK AND METHOD OF OPERATION

CROSS-REFERENCE TO RELATED APPLICATIONS

This Application claims the benefit of U.S. Provisional Application 61/710,312 filed on Oct. 5, 2012.

BACKGROUND

In fiber-optic communications, wavelength-division multiplexing (WDM) is used to multiplex a number of optical carrier signals onto a single optical fiber by using different wavelengths of laser light. A WDM system uses a multiplexer at the transmitter to join a plurality of signals together, and a demultiplexer at the receiver to split them apart.

One benefit of implementing WDM in an optical system is that it allows the capacity of an optical communications network to be increased without laying more fiber. Thus, new technology can be implemented in an optical infrastructure without having to overhaul the backbone network. The capacity of a given link can be expanded simply by modifying or upgrading the multiplexers and demultiplexers at each end.

Different WDM systems use different wavelength patterns to implement a plurality of communication channels in an optical fiber. The different systems are referred to either as Conventional, or Coarse, WDM (CWDM) and Dense WDM (DWDM). WDM systems that provide up to 8 channels per fiber are referred to as CWDM, and systems that provide more channels per fiber are referred to as DWDM. DWDM systems typically provide 40 channels or 80 channels per fiber. The number of channels that can be accommodated per fiber is determined by channel spacing. Wide spacing allows the use of less sophisticated, and therefore less expensive, transceivers. Herein, both CWDM and DWDM technologies are referred to collectively simply as WDM.

Network systems in general can be described in terms of a networking model promulgated by the Open Systems Interconnection effort at the International Organization for Standardization, the so-called "OSI model". The OSI model characterizes the functions of a communications system in terms of logical layers called abstraction layers. A layer serves the layer above it and is served by the layer below it, and various communication functions are grouped into the various layers. The OSI model is summarized in FIG. 1. As shown in the figure, layer 1 (L1) is called the Physical layer, and describes the physical media over which communication signals are propagated, as well as a description of the signal and binary transmission parameters. Layer 2 (L2) is called the Data Link layer, and describes datagram addressing. Layer 3 (L3) is called the Network layer, and its functions include path determination and logical addressing of messages in a communication channel. Collectively, L1, L2, and L3 are referred to as the media layers.

In this context, a communications protocol is a system of digital message formats, and rules for exchanging the messages in or between devices in telecommunications. The protocols may include signaling, authentication, error detection, and correction capabilities. The Internet Protocol (IP) is a communications protocol used for relaying datagrams (network packets) across a network, and is responsible for routing packets across network boundaries in an internetwork.

SUMMARY

A network and method of operating the network, the network comprising a transport layer that includes first and second disjoint but topologically substantially identical subnetworks, each having a plurality of optical switch nodes and/or reconfigurable optical add-drop multiplexer (ROADM) nodes, and a routing layer wherein each router is coupled to at least one node in A and at least one node in B. The network is operable to provide at least first class and second class services providing a high and a low Quality of Service, respectively. In normal operation, F traffic does not exceed half of the total instantaneous network traffic; all of the F traffic is carried on A and an amount of S traffic equal amount of F traffic is carried on B; and any remaining S traffic is split equally between A and B. In the case either of the subnetworks becomes non-operational, all of the traffic is transferred to the other subnetwork, the F traffic's QoS is maintained, and all of the S traffic is scheduled to share any remaining traffic carrying capacity of the operational subnetwork.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings:

FIG. 1 is a table summarizing the OSI model;

DETAILED DESCRIPTION

It is to be understood that the figures and descriptions provided herein may have been simplified to illustrate elements that are relevant for a clear understanding of the present invention, while eliminating, for the purpose of clarity, other elements found in typical optical signal detection systems and methods. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art of optical network operation.

Figure 2:
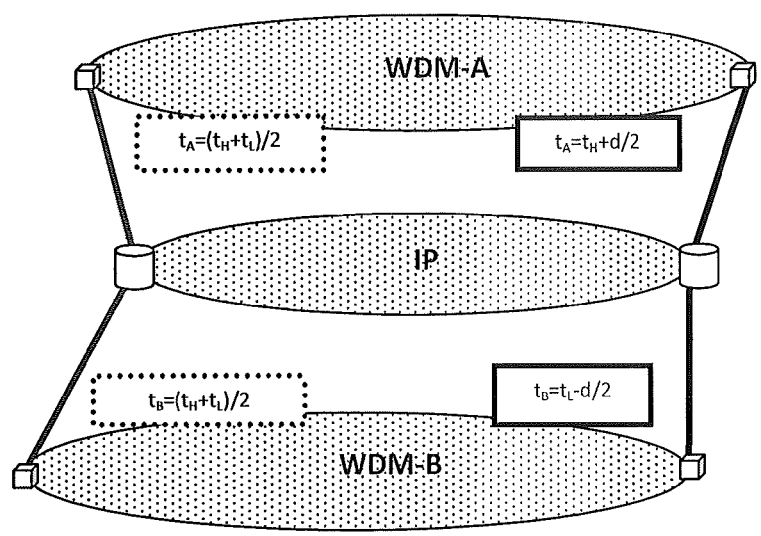
FIG. 2 illustrates two different traffic management strategies, Scheme 1 (dotted boxes) and Scheme 2 (solid boxes), during normal operation.

The herein disclosed systems and methods pertain to the operation of an optical communication network, and in particular a network that uses IP over CWDM or IP over DWDM (collectively, IPoWDM). The network consists of an IP/MPLS (Multiprotocol Label Switching, a data-carrying mechanism) routing layer (L3) and an underlying WDM transport layer (L2/L1). The WDM layer consists of two identical disjoint sub-networks, referred to herein as WDM-A ("A") and WDM-B ("B"). During normal operation A and B operate independently of each other, but at other times either one can act as a backup for the other. Any given router in L3 is connected to at least one node in A and at least one node in B. A and B can be described as mutual isomorphic and mutual disconnected sub-graphs within an IPoWDM graph. They are connected indirectly through vertices of an IP-sub-graph, such that each IP-vertex has at least one edge incident to A and at least one edge incident to B. Physically, a link connecting two nodes within A and the corresponding link connecting the corresponding two nodes in B are deployed in different ducts that are sufficiently separated from each other to minimize the possibility that an event causing an outage in either duct, such as digging equipment that inadvertently cuts or otherwise damages a duct and the cable therein, would also cause an outage in the other. Each network node thus includes three vertices in close proximity, each belonging to a different subnetwork, for example as illustrated in FIG. 2. This architecture can provide resilience by diverting traffic between A and B in the event of an outage in either network. For example, in the case of cable damage in A, the IP-WDM interface can divert traffic from A to B, thus maintaining the service during the event. This capability of resilience relies on traffic management in the IP-layer, or more particularly, on traffic management at the interface between the IP-layer and both WDM-layers A and B. Different strategies of traffic management lead to different cost and performance benefits.

Resilience Schemes

Some of the embodiments described hereinafter provide only two classes of service. However, as would be appreciated by one of ordinary skill in the art, the method disclosed can be extended to three or more service classes. Hereinafter, the abbreviations H and L will be used for "high class service" and "low class service", respectively. The difference between the two classes is that H traffic is provided with a predetermined quality of service (e.g. QoS), while the L traffic is not. Consequently, the L traffic can tolerate more delay.

Scheme 1 uses no more than half the traffic carrying capacity of network A and network B during normal operation. Thus, either one can accommodate all of the traffic from the other in case of an outage, such as an incident that damages an optical fiber cable. The network in which the outage occurs is referred to as the victim, and the other network is referred to as the backup. In this scheme, all traffic in the victim network is rerouted to the backup network. As such, the resilience of the system is simple and reliable. The drawback is the need for complete system redundancy, resulting in high cost for the network operator.

In contrast, in Scheme 2 traffic at the IP-WDM interface can be discriminated by the router according to the service class of the traffic, and can be redirected to the backup network based on the traffic class.

Figure 3:
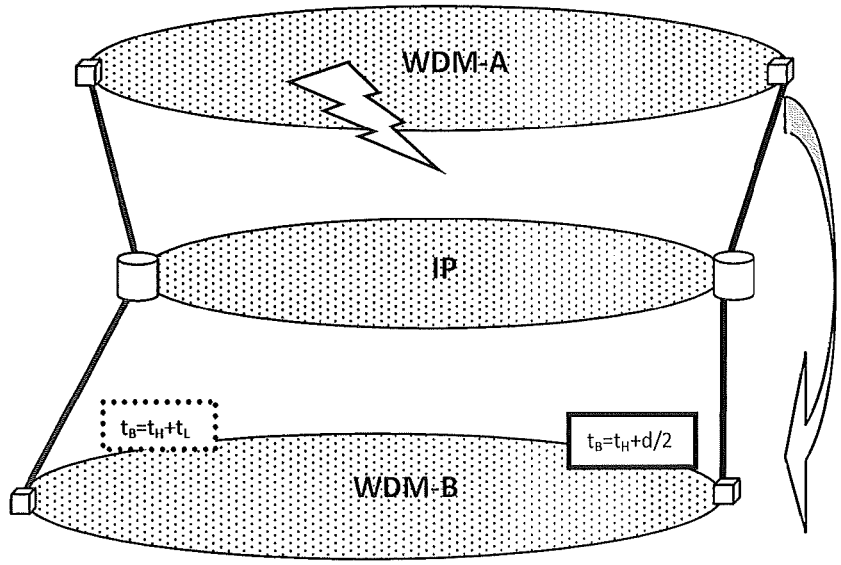
FIG. 3 illustrates the two different management strategies after an incident that renders A inoperable.

Exemplary scenarios are illustrated in FIGS. 2 and 3. In FIGS. 2 and 3, a network having a WDM layer comprising two disjoint subnetworks, WDM-A and WDM-B, is coupled to an IP layer. The IP layer is illustrated as containing two exemplary routers, and each router is communicatively coupled to a node in A and a node in B. It is understood that the IP layer would typically include a much greater number of routing elements, and each router can be coupled to a plurality of nodes in A and a corresponding plurality of nodes in B. FIGS. 2 and 3 show two schemes of operation, Scheme 1 (dotted boxes on the left), and Scheme 2 (solid boxes on the right). FIG. 2 shows each scheme during normal operation, and FIG. 3 shows each scheme after an outage occurs in A and all of its traffic is transferred to B. In the figures, "t" signifies network traffic, and its subscript indicates the class of traffic (H or L), or the subnetwork on which the traffic flows (A or B).

Using Scheme 1, during normal operation as shown in FIG. 2, the routers and the IP-WDM interface do not differentiate between H and L traffic, and the interface fills transport networks A and B equally. All network traffic, including both H traffic and L traffic, is split equally between A and B. In the case of an outage in A as shown in FIG. 3, all A traffic is diverted to B. As shown, the combined network traffic does not exceed the capacity of B and no traffic is dropped. However, if the combined traffic exceeds the capacity of B and the network is not able to differentiate between H and L traffic and schedule traffic, then some portion of the traffic will be dropped, including both H traffic and L traffic.

In an exemplary scenario (not illustrated), assume that the IP-WDM interface is upgraded to differentiate between H and L traffic, and H traffic is carried entirely by A during normal operation. Since the traffic volume of H clients is normally less than that of L clients, and the two networks A and B have the same capacity due to symmetry, network A is typically less loaded than network B. Thus, some L traffic can be directed to A such that A and B are equally loaded during normal operation. Then, in case of an outage in A, B could drop all of its traffic, and all traffic on A can be diverted to B. Thereby, the QoS of all of the H traffic is maintained, and only a portion of the L traffic is dropped.

However, in Scheme 2 the IP-WDM interfaces are further upgraded to have scheduling capability so that resources in B can be shared. As shown in FIGS. 2 and 3, during normal operation all of the H traffic is carried entirely by A, preferably together with a portion of the L traffic. Alternatively, both A and B can carry a portion of both the H traffic and the L traffic (not shown). In either case, in an outage of A, the A traffic can be diverted to B and the QoS of the H traffic can be maintained, and any remaining capacity on B can be shared by all of the L traffic. Thereby, the H traffic continues to receive the same QoS, while all of the L traffic continues being served, but with some additional delay. The amount of delay depends on the amount of H and L traffic in the total traffic volume, the capacity of the backup network, the restoration time in the WDM-layer, etc. This scheme takes advantage of the lower QoS and resulting tolerance for delay of the low class traffic to reduce the cost of capacity provisioning in the WDM-layer.

In particular as shown in FIGS. 2 and 3, in Scheme 1, the IP-WDM interface does not differentiate between H and L traffic, and the interface fills transport networks A and B equally. In case of a fiber cut in A, the interface moves traffic in A ($t_A$) from A to B. To ensure traffic in B is not affected by this action, and since A and B are topologically equivalent, both A and B cannot be loaded to more than half of their capacity during normal operation. Therefore, as traffic volume grows, the capacity of both A and B must be increased when they are at only 50% capacity.

In Scheme 2 however, the IP-WDM interface can differentiate between H and L traffic. In normal operation, network A carries all of the H traffic, and B is loaded with an amount of L traffic equal to the amount of H traffic on A. Because in general there is more L traffic than H traffic on a network, a portion of L traffic is not yet scheduled, equal to the total L minus the total H. In the illustrative embodiment shown in the figures, that L traffic can be split equally between A and B. Then, in the case of an outage in A, all A traffic, including all of the H traffic and a portion of the L traffic, is diverted to B. B is then operated so that the QoS of the H traffic is maintained, and all of the L traffic is managed to share any remaining capacity on B. When A is restored, all of the H traffic is directed back to A, and the L traffic is shared as before. In Scheme 2, as traffic volume grows, the capacity of A and B need not be increased until the H volume alone is sufficient to load either network to 100% of its capacity. This can result in a dramatic savings in capital expansion or leasing costs compared to Scheme 1.

Survivability

A cable outage can be modeled as a stochastic process distributed on the edges of A and occasionally exceeds a threshold to cause a cable defect at an edge. Then, the service survivability is defined as the probability of a service that survives the event of cable cut somewhere in the WDM-layer. An event of cable cut in A will trigger the corresponding IP-WDM interface to divert all traffic from A to B. Let $S_A$ and $S_B$ be the event that a cable survives such an accident in A and in B, respectively. Then the probability of fiber outage in A and B are $p_A=1-Pr(S_A)$ and $p_B=1-Pr(S_B)$, respectively.

In Scheme 1, all traffic shares the same fate, regardless of traffic class. Then in the event of an outage in a victim network, service survival has the probability $$P_I \stackrel{\triangle}{=} Pr(S_A \cup S_B)) = 1 - p_A p_B$$

because $S_A$ and $S_B$ are mutually independent.

In Scheme 2, the interface differentiates H and L traffic, places all H traffic on A and shares L traffic between A and B as previously described. Then, in an outage of a victim network, the respective survivability of the H clients and the L clients can be determined as follows.

For the H traffic, the event of survival has the probability $$P_{II}(H) \stackrel{\triangle}{=} Pr[S_A \cup ((S_{\overline{A}} \cap S_B)] = 1 - p_A p_B$$

For the L traffic, resource sharing as previously described results in added delay due to scheduling, but all traffic is still served as long as the amount of H traffic is less than 100% of the backup network capacity. As a result, the probability of survival of L clients under this condition is $$P_{II}(L, a<\tfrac{1}{2}) \stackrel{\triangle}{=} Pr[(S_A \cap S_B) \cup (S_{\overline{A}} \cap S_B)] = 1 - p_B$$

On the other hand, if the amount of H traffic equals 100% of the backup network capacity, the probability of survival of L clients is $$P_{II}(L, a=\tfrac{1}{2}) \stackrel{\triangle}{=} Pr[(S_A \cap S_B)] = (1 - p_A)(1 - p_B)$$

Performance

To evaluate the performance of Scheme II versus Scheme I, the following metrics may be used:

$$C(H) := (P_{II}(H))/P_I = (1 - p_A p_B)/(1 - p_A p_B) = 1$$

$$C(L, a<\tfrac{1}{2}) := (P_{II}(L, a<\tfrac{1}{2}))/P_I = (1 - p_B)/(1 - p_A p_B)$$

$$C(L, a=\tfrac{1}{2}) := (P_{II}(L, a=\tfrac{1}{2}))/P_I = (1 - p_A)(1 - p_B))/(1 - p_A p_B)$$

A metric value less than one indicates performance degradation of Scheme 2 compared to Scheme 1. For $p_A, p_B \in [0,1)$ we obtain the general relation $$1 = C(H) \leq C(L, a<\tfrac{1}{2}) \leq C(L, a=\tfrac{1}{2})$$

Figure 4:
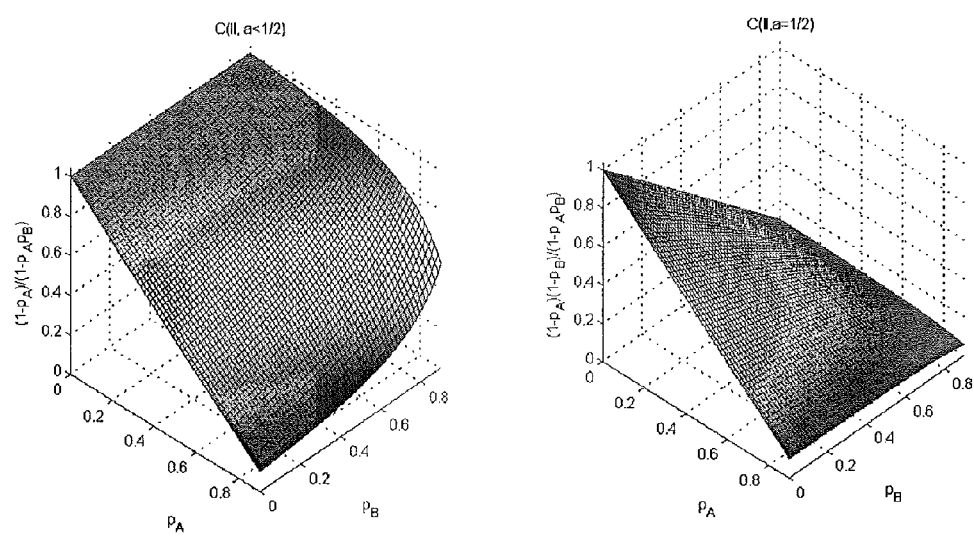
FIG. 4 is a graph showing the relative performance of Scheme 1 versus Scheme 2 with regard to the quality of service provided by the network when A is inoperable.

Here, a value of one means there is no change in terms of survivability for H clients in Scheme 2. The service quality degradation for L clients in Scheme 2 is expected, because the service continuity for L clients is provided at the cost of additional delay. The delay is not, however, included in the above metric. The metric above is an indicator for the relative performance in terms of survivability ratio. As such, the magnitude of the service quality degradation is dictated by the cable outage in both A and B. As shown in FIG. 4, within a realistic range of values for $p_A$ and $p_B$, the magnitude of the metric is of the second order.

This analysis shows that, while maintaining the same quality of service for H clients, Scheme 2 has a dramatic cost advantage over Scheme 1. This is because in Scheme 1, A and B can be loaded to only 50% of their capacity during normal operation but, both can be loaded to their full capacity in Scheme 2. Thus, the initial cost of building or leasing an optical network in accordance with Scheme 2 is only about half that of Scheme 1. Moreover, the cost of expanding an existing network is incurred in Scheme 1 when the network loading approaches only 50% of capacity. In contrast, the cost of expansion can be delayed in Scheme 2 until the network loading approaches 100% of capacity, a delay of perhaps many years. The time value of money can cause a long-delayed expenditure to have a present value that is a small fraction of the future cost. Accordingly, a relatively small cost incurred to upgrade the routers and/or the IP-WDM interface to discriminate between different traffic classes can result in a savings equal to the large majority of the cost of increasing the capacity of the network.

It is noted that improvement in the QoS provided to L traffic can be achieved by increasing the speed of optical protection switching and restoration within the WDM-layer.

The foregoing describes embodiments of a network comprising a transport layer that includes a first subnetwork (A) having a plurality of optical switch nodes and/or reconfigurable optical add-drop multiplexer (ROADM) nodes, and a second subnetwork (B) disjoint from and topologically substantially identical to A. The network also includes a routing layer (L3) comprising a plurality of routers, each router communicatively coupled to at least one node in A and at least one node in B. The network is operable to provide first priority network traffic (F) with a first class service having a first Quality of Service (QoS) and second priority network traffic (S) with a second class service having a second QoS lower than the first QoS. In normal operation, F traffic does not exceed half of the total instantaneous network traffic of the entire network. The routing layer and/or the interface between the routing layer and the transport layer is operable to differentiate between a plurality of classes of service each having a corresponding QoS, and is further operable to schedule traffic based on its service class.

In an embodiment, in normal operation all of the F traffic is carried on A, and an amount of S traffic equal to the amount of F traffic is carried on B. Any remaining S traffic is split equally between A and B. In the event either A or B becomes non-operational, all of the F traffic is carried by the operational subnetwork, and the F traffic's QoS is maintained. The S traffic is then constrained to share any remaining traffic carrying capacity of the operational subnetwork.

In an embodiment, the network is an optical network that implements at least one of Internet Protocol (IP) over Coarse Wavelength-Division Multiplexing (CWDM) or IP over Dense WDM (DWDM). In an embodiment, the network implements IP Multiprotocol Label Switching (IP/MPLS). In an embodiment, the network guarantees at least a predetermined F QoS to the F traffic and an S QoS to the S traffic that is more tolerant of delivery delay than the F QoS. In the event of a cable defect or outage, the S traffic is constrained by a predetermined tolerable delay in delivery of at least a portion of the S traffic. In an embodiment, the S traffic delay may be implemented using a packet scheduling scheme, and the delay may be uniform for all of the S traffic. In embodiments, each of the routers is operable to direct traffic to A or B based at least in part on the traffic's service class.

A method of operating an optical network is also disclosed in which the network has a transport layer that includes a first subnetwork (A) having a plurality of optical switch nodes and/or reconfigurable optical add-drop multiplexer (ROADM) nodes, and a second subnetwork (B) disjoint from and topologically substantially identical to A. The network also includes a routing layer (L3) comprising a plurality of routers, each router communicatively coupled to at least one node in A and at least one node in B. Each router, or an interface between the router and the transport layer, differentiates between a plurality of service classes with corresponding QoS, and schedules traffic based on its service class. In an embodiment, the network traffic includes first priority network traffic (F) with a first class service having a first Quality of Service (QoS), and second priority network traffic (S) with a second class service having a QoS lower than the first QoS.

The network is operated such that in normal operation the F traffic does not exceed half of the total instantaneous network traffic. In an embodiment, in the event one of A and B becomes non-operational, the routers, or interfaces between the routers and their respective corresponding nodes, transfer all of the traffic to the operational subnetwork. The QoS of the F traffic is maintained; and the S traffic is constrained to share any remaining traffic carrying capacity of the operational subnetwork. In an embodiment, in normal operation the network directs all of the F traffic to A, and an amount of S traffic to B that is equal to the amount of F traffic. Any remaining S traffic is split between A and B.

In an embodiment, the network implements Internet Protocol (IP) over Coarse Wavelength-Division Multiplexing (CWDM) or Internet Protocol (IP) over Dense Wavelength-Division Multiplexing (DWDM) on a WDM transport layer. In an embodiment, the network implements IP Multiprotocol Label Switching (IP/MPLS). The network may guarantee the first QoS to the F traffic and a different QoS to the S traffic. In an embodiment, in the event A becomes non-operational, the S traffic may be scheduled for delayed delivery on the operational B. In an embodiment, the S traffic delay is implemented using a round robin schedule.

In an embodiment, the routers, and/or the interfaces between the routers and their respective corresponding nodes, direct traffic to and/or from a transport layer of the network based on the traffic's service class. In an embodiment, the network may be operated to provide at least a third priority network traffic (T) with a third class service having a third QoS lower than the first and second QoS. In the event A becomes non-operational, the T traffic being carried on A may be transferred to the operational B, and the T traffic transferred to B may be scheduled to share any traffic carrying capacity of B that remains after the F and the S traffic are scheduled. In an embodiment, the routers and/or the interfaces between the routers and their respective corresponding nodes (hereinafter collectively "routers") are aware of the percentage of the total network capacity used by F traffic. In an embodiment, the routers recognize the class of service of traffic in a packet stream being processed. In an embodiment, the routers may split the traffic stream between the router and the WDM layers by means of TDM or WDM, so that a predetermined percentage of F and S traffic goes to A and a different predetermined percentage of F and S traffic goes to B. In an embodiment, an alarm is generated in the event of an equipment outage in the WDM-layer, and the affected routers are aware of the state of the WDM-layer in view of the equipment outage. Responsive to the alarm, the affected routers may divert packets from A to B without interruption of packet delivery service. In particular, the F traffic is scheduled to be delivered in accordance with the F QoS, and the S traffic is scheduled to share any remaining capacity on B. Responsive to a confirmation that A has been restored, the network traffic pattern is returned to its pre-alarm state.

Although the invention has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

What is claimed is:

1. A network comprising:
   a transport layer that includes:
      a first subnetwork (A) having a plurality of optical switch nodes and/or reconfigurable optical add-drop multiplexer (ROADM) nodes, and
      a second subnetwork (B) disjoint from and topologically substantially identical to A; and
   a routing layer (L3) comprising a plurality of routers, each router communicatively coupled directly and/or through an interface to at least one node in A and at least one node in B;
   wherein the network is operable to provide first priority network traffic (F traffic) with a first class service having a first Quality of Service (QoS) and second priority network traffic (S traffic) with a second class service having a second QoS lower than the first QoS; and
   wherein, in normal operation, F traffic does not exceed half of the total instantaneous network traffic and the network is configured to direct all of the F traffic to A and an amount of S traffic to B that is equal to the amount of F traffic and to split any remaining S traffic between A and B; and
   wherein the routers of the routing layer and/or the interfaces between the routers of the routing layer and the nodes of the transport layer subnetworks A and B coupled thereto, are configured to direct traffic to and/or from a subnetwork of the transport layer based on the traffic's service class and are operable to
   be aware of the percentage of the network capacity used by F traffic,
   recognize the class of service of traffic in a packet stream processed by the corresponding router,
   split the traffic stream between the corresponding router and the WDM layer, by means of TDM or WDM, so that a predetermined percentage of F and S traffic goes to A and a different predetermined percentage of F and S traffic goes to B;
   receive an alarm in case of an equipment outage in the WDM-layer, and be aware of the state of the WDM-layer in view of the equipment outage; and
   responsive to the alarm:
      divert packets from A to B without interruption of packet delivery service;
      schedule the F traffic to be delivered in accordance with the F QoS, and schedule the S traffic to share any remaining capacity on B; and
   responsive to a confirmation that A has been restored, return the traffic pattern to the pre-alarm state.

2. The network of claim 1, wherein:
   all of the F traffic is carried on A and an amount of S traffic equal amount of F traffic is carried on B; and any remaining S traffic is split equally between A and B; and
   in the case of one of either A or B becomes non-operational, all of the F traffic that would have passed through both of the non-operational subnetwork and the operational subnetwork is carried by the operational subnetwork, and the F traffic's QoS is maintained.

3. The network of claim 1, wherein the network is an optical network that implements Internet Protocol (IP) over Wavelength-Division Multiplexing (WDM) or IP over Dense WDM (DWDM).

4. The network of claim 1, wherein the network implements IP Multiprotocol Label Switching (IP/MPLS).

5. The network of claim 1, wherein the network guarantees at least a predetermined F QoS to the F traffic and a S QoS to the S traffic that is more tolerant of delivery delay than the F QoS.

6. The network of claim 5, wherein in case of a cable defect the S traffic is constrained by a predetermined tolerable delay in delivery of at least a portion of the S traffic.

7. The network of claim 1, wherein each of the routers is operable to direct traffic to A or B based on the traffic's service class.

8. A method of operating an optical network that has a transport layer that includes a first subnetwork (A) having a plurality of optical switch nodes and/or reconfigurable optical add-drop multiplexer (ROADM) nodes, a second subnetwork (B) mutually disconnected and disjoint from and mutually isomorphically and topologically substantially identical to A, and a routing layer (L3) having a plurality of routers, each router communicatively coupled directly and/or through a respective interface to at least one node in A and at least one node in B, wherein each router and/or the interface between the router and the at least one node in A and the at least one node in B differentiates between a plurality of service classes with corresponding QoS and schedules traffic based on its service class, the method of operating the network comprising:

providing first priority network traffic (F) with a first class service having a first Quality of Service (QoS) and second priority network traffic (S) with a second class service having a QoS lower than the first QoS;

managing traffic through the network during normal operation so that any of the F traffic passing through of A together with any of the F traffic passing through B does not exceed half of the total instantaneous network traffic passing through both A and B and wherein the network is configured to direct all of the F traffic to A and an amount of S traffic to B that is equal to the amount of F traffic and to split any remaining S traffic between A and B;

wherein the routers and/or the interfaces between the routers and the transport layer nodes, are configured to direct traffic to and/or from a subnetwork of the transport layer based on the traffic's service class and are operable to:

be aware of the percentage of the network capacity used by F traffic, recognize the class of service of traffic in a packet stream processed by the corresponding router, split the traffic stream between the corresponding router and the WDM layer, by means of TDM or WDM, so that a predetermined percentage of F and S traffic goes to A and a different predetermined percentage of F and S traffic goes to B;

receive an alarm in case of an equipment outage in the WDM-layer, and be aware of the state of the WDM-layer in view of the equipment outage; and responsive to the alarm:

divert packets from A to B without interruption of packet delivery service;

schedule the F traffic to be delivered in accordance with the F QoS, and schedule the S traffic to share any remaining capacity on B; and responsive to a confirmation that A has been restored, return the traffic pattern to the pre-alarm state; and wherein in the case either one of A and B becomes non-operational:

routing all of the F traffic that would have passed through both the non-operational subnetwork and the corresponding operational other subnetwork to the operable subnetwork; and maintaining the QoS of the F traffic.

9. The method of claim 8, wherein the network implements Internet Protocol (IP) over Wavelength-Division Multiplexing (WDM) or Internet Protocol (IP) over Dense Wavelength-Division Multiplexing (DWDM) on a WDM layer.

10. The method of claim 8, wherein the network implements IP Multiprotocol Label Switching (IP/MPLS).

11. The method of claim 8 wherein the network guarantees the first QoS to the F traffic and a different QoS to the S traffic.

12. The method of claim 8, wherein, in the case A is non-operational, at least a portion of the S traffic is scheduled for delayed delivery on B.

13. The method of claim 12, wherein the S traffic delay is implemented using a round robin schedule.

14. The method of claim 8, wherein the network provides at least a third priority network traffic (T) with a third class service having a third QoS lower than the first QoS.

* * * * *